United States Patent
Torok et al.

(10) Patent No.: US 10,611,209 B2
(45) Date of Patent: Apr. 7, 2020

(54) HVAC UNIT

(71) Applicant: Denso International America, Inc., Southfield, MI (US)

(72) Inventors: Scott Torok, Allen Park, MI (US); Thurman Farley, II, Taylor, MI (US); Brett Wilson, Allen Park, MI (US)

(73) Assignee: DENSO International America, Inc., Southfield, MI (US)

( * ) Notice: Subject to any disclaimer, the term of this patent is extended or adjusted under 35 U.S.C. 154(b) by 532 days.

(21) Appl. No.: 15/398,211

(22) Filed: Jan. 4, 2017

(65) Prior Publication Data

US 2018/0186213 A1   Jul. 5, 2018

(51) Int. Cl.
    *B60H 1/00*    (2006.01)

(52) U.S. Cl.
    CPC ..... *B60H 1/00064* (2013.01); *B60H 1/00678* (2013.01); *B60H 1/00692* (2013.01); *B60H 2001/0015* (2013.01)

(58) Field of Classification Search
    CPC ............ B60H 1/00064; B60H 1/00692; B60H 2001/0015
    USPC .................................................. 165/202–204
    See application file for complete search history.

(56) References Cited

U.S. PATENT DOCUMENTS

| | | | |
|---|---|---|---|
| 5,154,223 A * | 10/1992 | Ishimaru | B60H 1/00064 137/872 |
| 5,699,851 A | 12/1997 | Saida et al. | |
| 6,032,723 A | 3/2000 | Tsuihiji et al. | |
| 6,048,263 A | 4/2000 | Uchida et al. | |
| 6,092,592 A | 7/2000 | Toyoshima et al. | |
| 6,431,266 B1 * | 8/2002 | Han | B60H 1/00842 165/204 |
| 6,450,246 B1 | 9/2002 | Kurokawa et al. | |
| 6,609,389 B2 * | 8/2003 | Ozeki | B60H 1/0005 454/121 |
| 7,108,599 B2 * | 9/2006 | Kachi | B60H 1/00428 165/202 |
| 7,658,671 B2 * | 2/2010 | Balzo | B60H 1/00671 454/152 |
| 9,180,751 B2 * | 11/2015 | Han | B60H 1/00692 |
| 9,180,752 B2 * | 11/2015 | Buczek | B60H 1/00064 |
| 9,221,318 B2 * | 12/2015 | Uemura | B60H 1/00849 |
| 2001/0008148 A1 | 7/2001 | Ito et al. | |
| 2001/0008183 A1 | 7/2001 | Ito et al. | |
| 2001/0027861 A1 | 10/2001 | Tsurushima et al. | |
| 2001/0035019 A1 | 11/2001 | Arold | |
| 2002/0009968 A1 | 1/2002 | Tsurushima et al. | |
| 2002/0139513 A1 | 10/2002 | Natsume et al. | |
| 2002/0197951 A1 | 12/2002 | Uemura et al. | |

(Continued)

*Primary Examiner* — Leonard R Leo (74) *Attorney, Agent, or Firm* — Harness, Dickey & Pierce, P.L.C.

(57) ABSTRACT

The present teachings include a heating, ventilation, and air conditioning (HVAC) unit including an evaporator, a heater core, and an airflow control door. The heater core is arranged downstream of the evaporator with respect to a direction of airflow through the HVAC unit. The airflow control door is downstream of both the evaporator and the heater core. The airflow control door is movable to increase and decrease a cross-sectional area of an airflow path downstream of the temperature control door, such as to facilitate mixing of airflow that has passed through the heater core with airflow that has passed around the heater core.

15 Claims, 6 Drawing Sheets

(56) References Cited

U.S. PATENT DOCUMENTS

| | | |
|---|---|---|
| 2003/0094262 A1 | 5/2003 | Kondo |
| 2004/0194947 A1 | 10/2004 | Ito et al. |
| 2005/0227606 A1 | 10/2005 | Oide |
| 2007/0266726 A1 | 11/2007 | Tada et al. |
| 2008/0176502 A1 | 7/2008 | Hashimoto |
| 2009/0305625 A1 | 12/2009 | Dawson et al. |
| 2010/0139308 A1 | 6/2010 | Eguchi et al. |
| 2013/0008627 A1 | 1/2013 | Uemura |
| 2013/0210332 A1 | 8/2013 | Chiba et al. |
| 2013/0288586 A1 | 10/2013 | Jang |
| 2016/0137022 A1 | 5/2016 | Sakakibara |

* cited by examiner

HVAC UNIT

FIELD

The present disclosure relates to a heating, ventilation, and air condition (HVAC) unit.

BACKGROUND

This section provides background information related to the present disclosure, which is not necessarily prior art.

Heating, ventilation, and air conditioning (HVAC) units often include an evaporator, a heater core, and a temperature control door. The evaporator, when activated, has the effect of cooling airflow that passes therethrough. The heater core, when activated, heats airflow passing therethrough. The temperature control door is typically arranged to control airflow from the evaporator through and around the heater core. For example, the temperature control door can be arranged to direct a portion of airflow from the evaporator around the heater core, and another portion of airflow from the evaporator through the heater core. In such an air-mix mode, airflow that has bypassed the heater core mixes with airflow that has passed through the heater core at some point in the HVAC unit downstream of the heater core in order to generate airflow of a relatively moderate temperature. To facilitate mixing of the relatively warm airflow that has passed through the heater core with the relatively cool airflow that has bypassed the heater core, HVAC units sometimes include vanes and/or baffles, which are helpful to mix the airflow, but often degrade performance of the HVAC unit by decreasing the cross-sectional area of the airflow path downstream of the heater core. It would thus be desirable to have an HVAC unit that facilitates mixing of airflow that has passed through the heater core with airflow that has bypassed the heater core without degrading HVAC performance. The present teachings advantageously include an HVAC unit that facilitates mixing of airflow downstream of the heater core while maintaining overall HVAC performance throughout various HVAC modes, such as an air-mix mode, a maximum cooling mode, and a maximum heating mode.

SUMMARY

This section provides a general summary of the disclosure, and is not a comprehensive disclosure of its full scope or all of its features.

The present teachings include a heating, ventilation, and air conditioning (HVAC) unit including an evaporator, a heater core, and an airflow control door. The heater core is arranged downstream of the evaporator with respect to a direction of airflow through the HVAC unit. The airflow control door is downstream of both the evaporator and the heater core. The airflow control door is movable to increase or decrease a cross-sectional area of an airflow path downstream of the temperature control door, such as to facilitate mixing of airflow that has passed through the heater core with airflow that has passed around the heater core.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
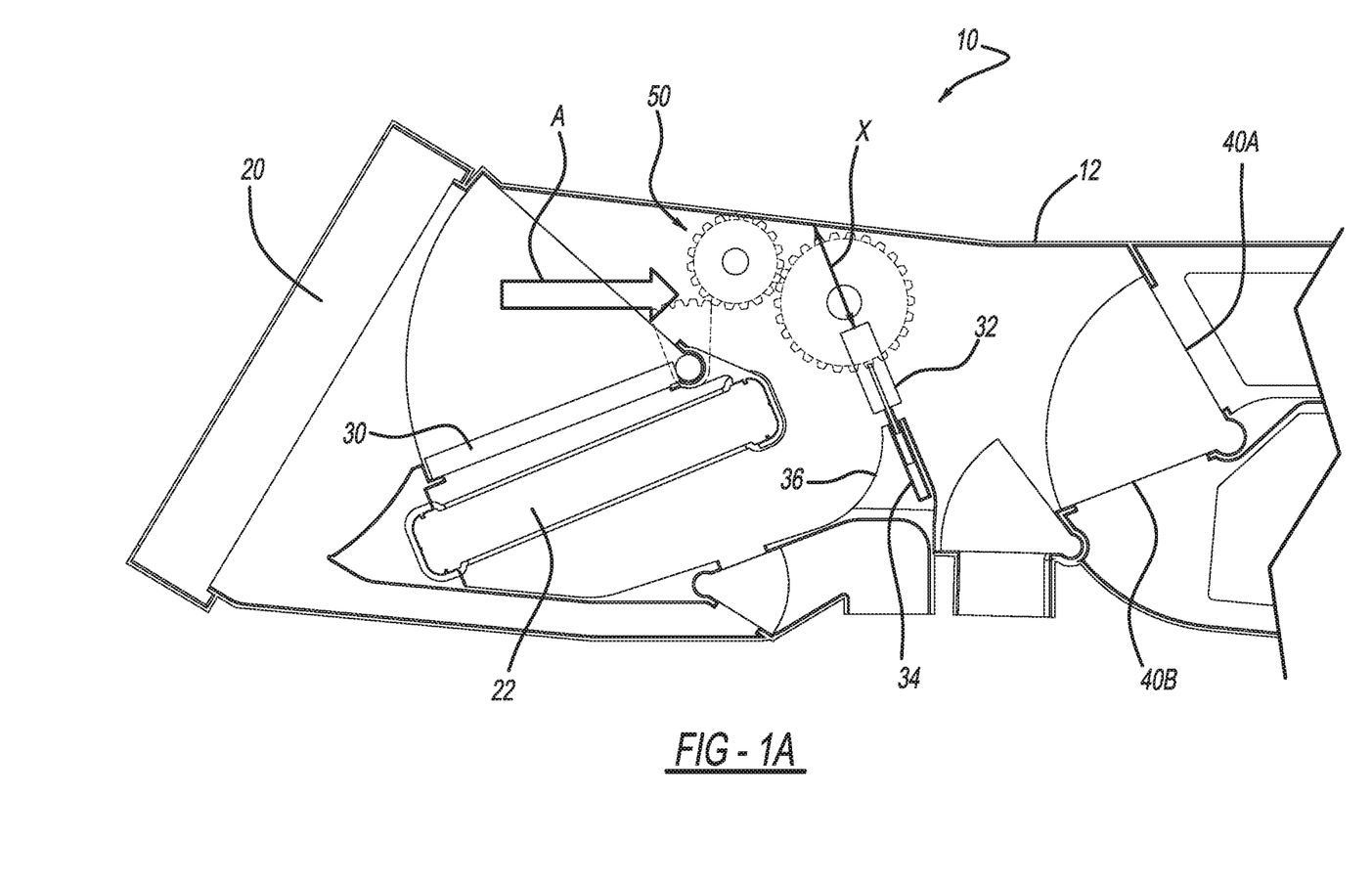
FIG. 1A is an interior cross-sectional view of an HVAC unit according to the present teachings arranged in a maximum cooling mode.

With initial reference to FIG. 1A, a heating, ventilation, and air conditioning (HVAC) unit according to the present teachings, and specifically an interior cross-sectional view thereof, is illustrated generally at reference numeral 10. The HVAC unit 10 can be configured for use in any suitable vehicle. For example, the HVAC unit 10 can be configured for use in a passenger vehicle having single or dual HVAC layouts, a mass transit vehicle, a military vehicle, a sport utility vehicle, a commercial vehicle, a construction vehicle, construction equipment, a watercraft, an aircraft, etc.

The HVAC unit 10 includes a case 12 housing an evaporator 20 and a heater core 22, which is arranged downstream of the evaporator 20 with respect to a direction of airflow through the HVAC unit 10. The evaporator 20 is any suitable evaporator configured to cool airflow passing therethrough when the evaporator 20 is activated. The heater core 22 is any suitable heater core configured to heat airflow passing therethrough when the heater core 22 is activated. Arranged between the evaporator 20 and the heater core 22 is a temperature control door 30. The temperature control door 30 can be any suitable airflow control device operable to control the path of airflow that has passed through the evaporator 20. In the example illustrated, the temperature control door 30 is a rotary door rotatable in any suitable manner, such as with any suitable servo motor, in response to a particular HVAC mode selection by a user, such as a maximum cooling mode (FIGS. 1A and 1B), a maximum heating mode (FIGS. 2A and 2B), and an air-mix mode (FIGS. 3A and 3B).

Downstream of the evaporator 20, the heater core 22, and the temperature control door 30, with respect to the direction of airflow through the HVAC unit 10, is an airflow control door 32. The airflow control door 32 can be any suitable airflow deflection device, such as any suitable door, wall, etc. movable (into and out of a receptacle 34 defined by the case 12, for example) to increase or decrease a cross-sectional area X of an airflow path defined by the case 12 downstream of the heater core 22 and the temperature control door 30. A ramped surface 36, such as of the case 12, is arranged proximate to the airflow control door 32 to facilitate airflow to and around the airflow control door 32, as explained further herein. Rotational movement of the temperature control door 30 results in linear movement of the airflow control door 32 due to linkage 50. Downstream of the airflow control door 32 are one or more airflow outlets defined by the case 12, such as airflow outlet 40A and airflow outlet 40B, from which air can exit the case 12 and be directed to various locations, such as within a passenger cabin for example.

Figure 1B:
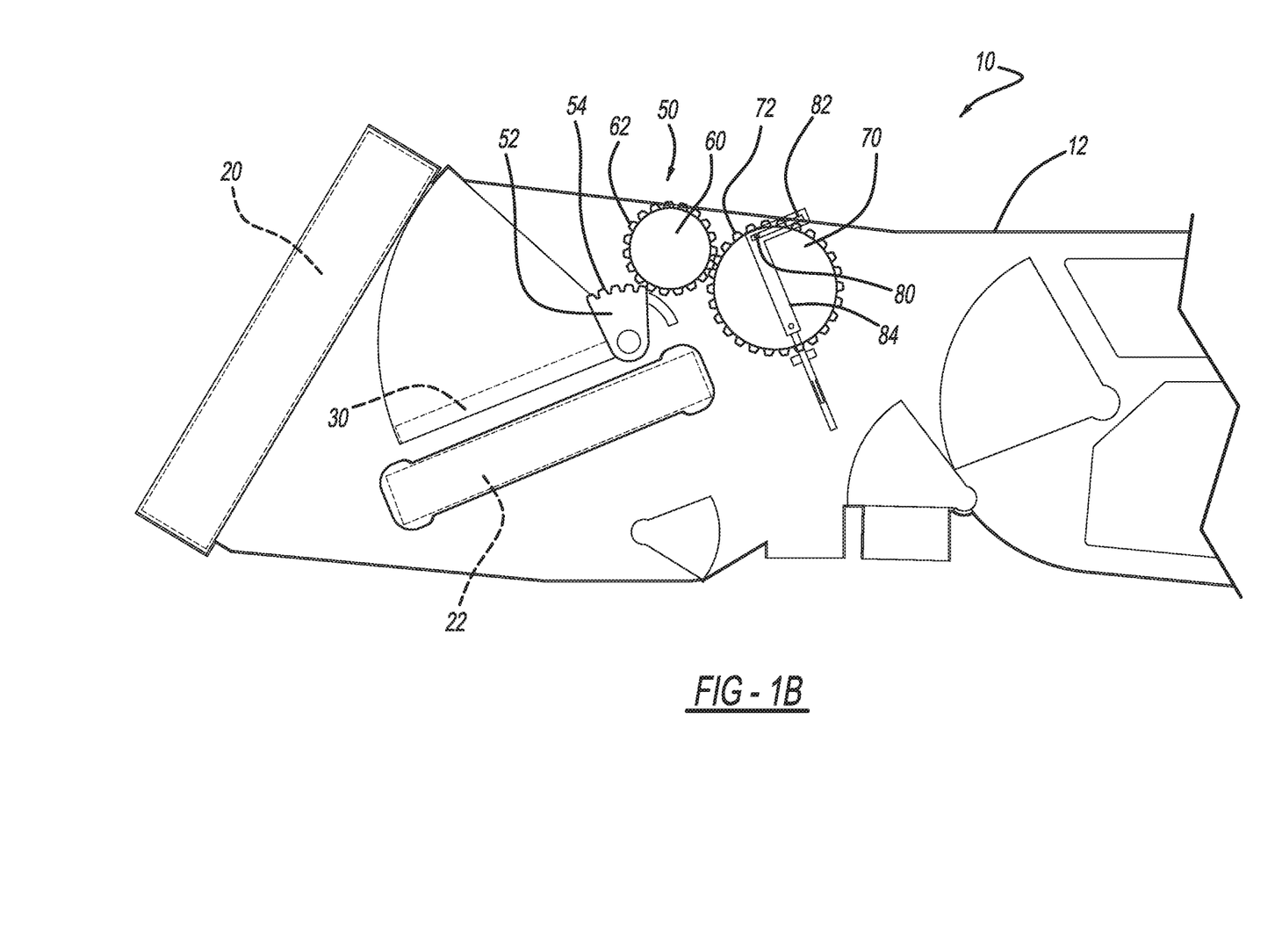
FIG. 1B is an exterior side view of the HVAC unit of FIG. 1A in the maximum cooling mode.

With continued reference to FIG. 1A, and additional reference to FIG. 1B, the linkage 50 will now be described. The linkage 50 generally includes a first gear 52 coupled to the temperature control door 30 such that rotation of the temperature control door 30, by a suitable servo motor for example, results in rotation of the first gear 52. The first gear 52 includes first gear teeth 54. The first gear 52 directly rotates an intermediate gear 60, which includes intermediate gear teeth 62. The first gear teeth 54 and the intermediate gear teeth 62 mesh with one another, such that rotation of the first gear 52 results in rotation of the intermediate gear 60. The linkage 50 further includes a second gear 70 having second gear teeth 72. The second gear teeth 72 mesh with the intermediate gear teeth 62. Therefore, rotation of the first gear 52 rotates the intermediate gear 60, which rotates the second gear 70.

The second gear 70 is connected to the airflow control door 32 in any suitable manner such that rotation of the second gear 70 results in linear movement of the airflow control door 32. For example, the second gear 70 can include a pin 80, which is received within a slot 82 of an arm 84. The arm 84 is coupled to the airflow control door 32. The pin 80 rotates with the second gear 70 to move the arm 84 linearly, which moves the airflow control door 32 linearly.

Movement of the temperature control door 30 and the airflow control door 32 in exemplary modes of the HVAC unit 10 will now be described. FIGS. 1A and 1B illustrate the HVAC unit 10 in a maximum cold (cooling) mode. In the maximum cold mode, the temperature control door 30 is arranged in a first position as illustrated in FIGS. 1A and 1B such that the temperature control door 30 extends across the heater core 22 and prevents airflow from the evaporator 20 from passing through the heater core 22. The evaporator 20 is activated to cool airflow passing therethrough, and a maximum amount of airflow that has passed through the evaporator 20 is directed in direction A (FIG. 1A) so as to flow around the heater core 22 and around the airflow control door 32, which is arranged in an extended position. In the extended position of FIG. 1A, the airflow control door 32 extends out from within the receptacle 34 to a maximum distance, thereby advantageously reducing the cross-sectional area X. With particular reference to FIG. 1B, when the temperature control door 30 is rotated to the first position of FIG. 1A, the first gear 52 rotates the intermediate gear 60, which rotates the second gear 70 to position the pin 80 thereof at a distance furthest from the airflow control door 32, which pulls the arm 84 and the airflow control door 32 coupled thereto to the extended position of FIG. 1A.

Figure 2A:
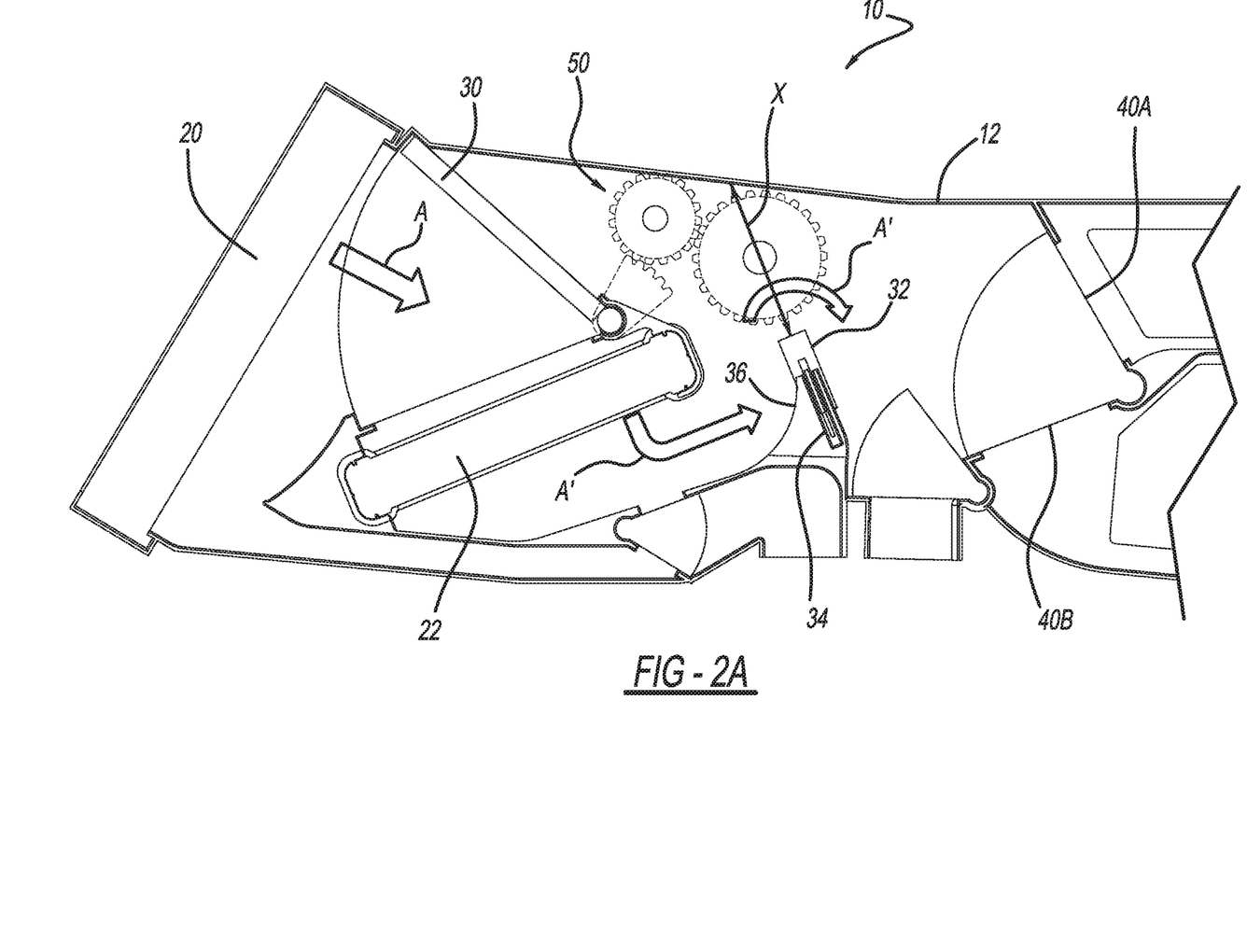
FIG. 2A is an interior cross-sectional view of the HVAC unit of FIG. 1A in a maximum heating mode.
Figure 2B:
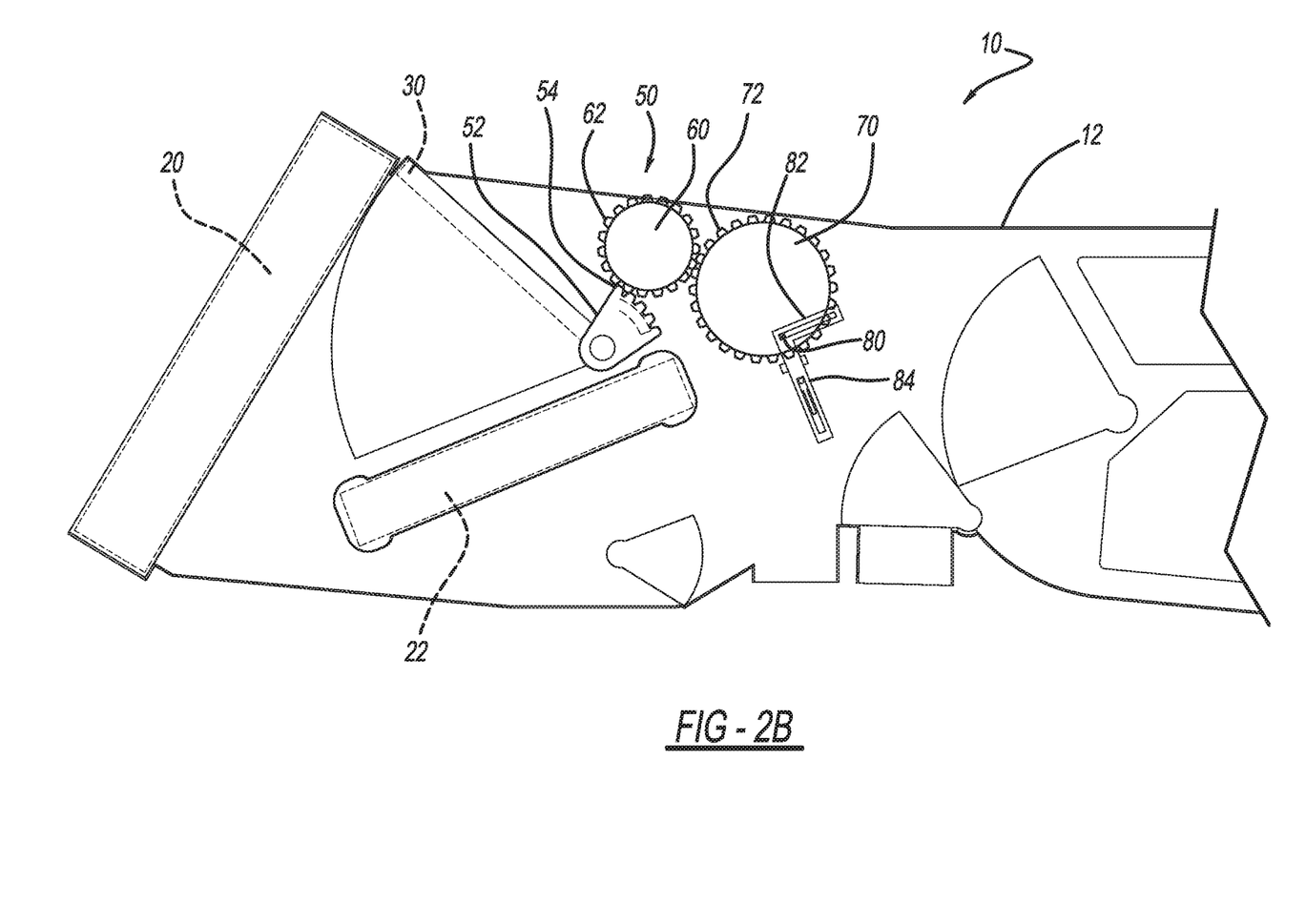
FIG. 2B is an exterior view of the HVAC unit according to the present teachings in the maximum heating mode.
Figure 3A:
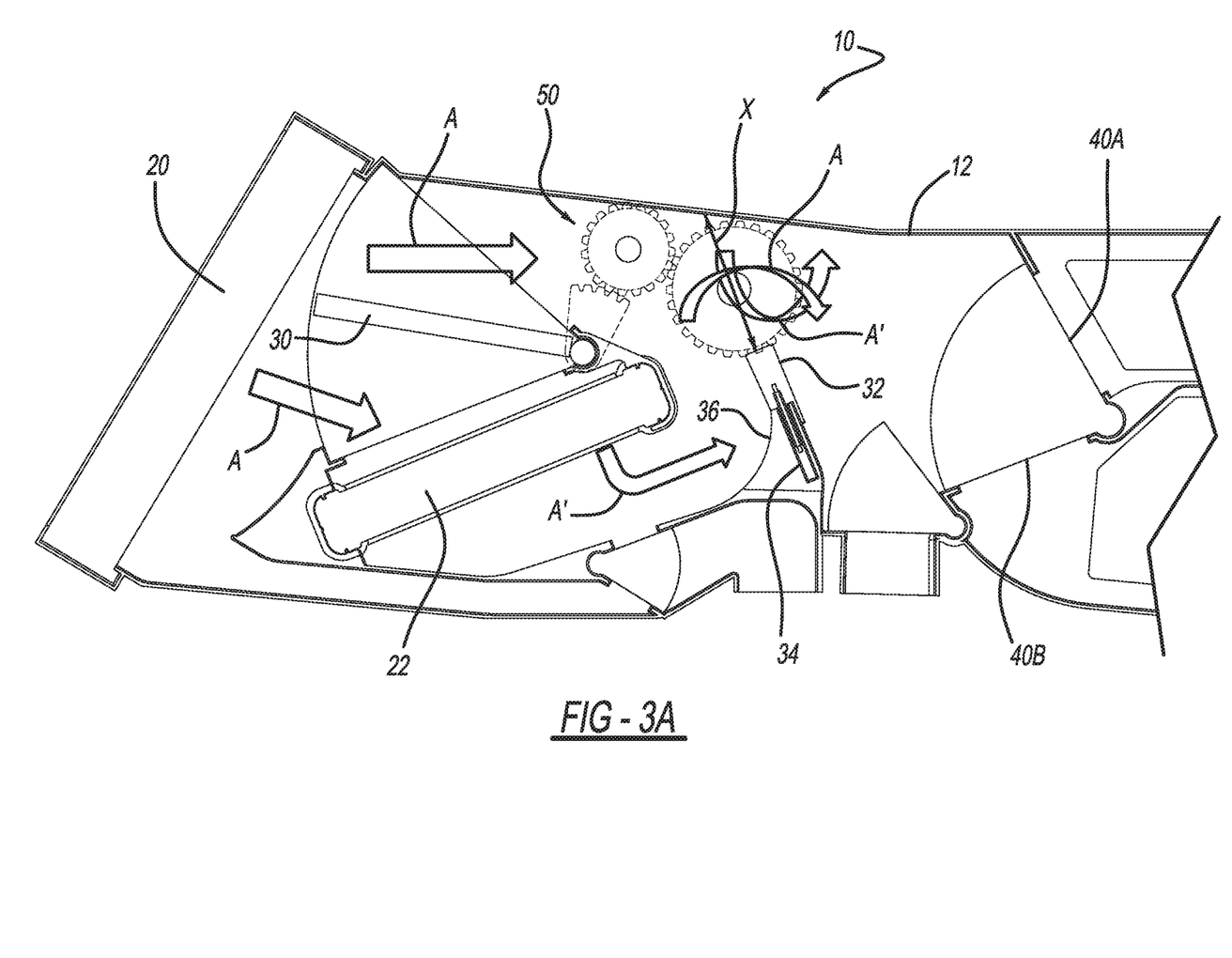
FIG. 3A is an interior cross-sectional view of the HVAC unit according to the present teachings in an air-mix mode.
Figure 3B:
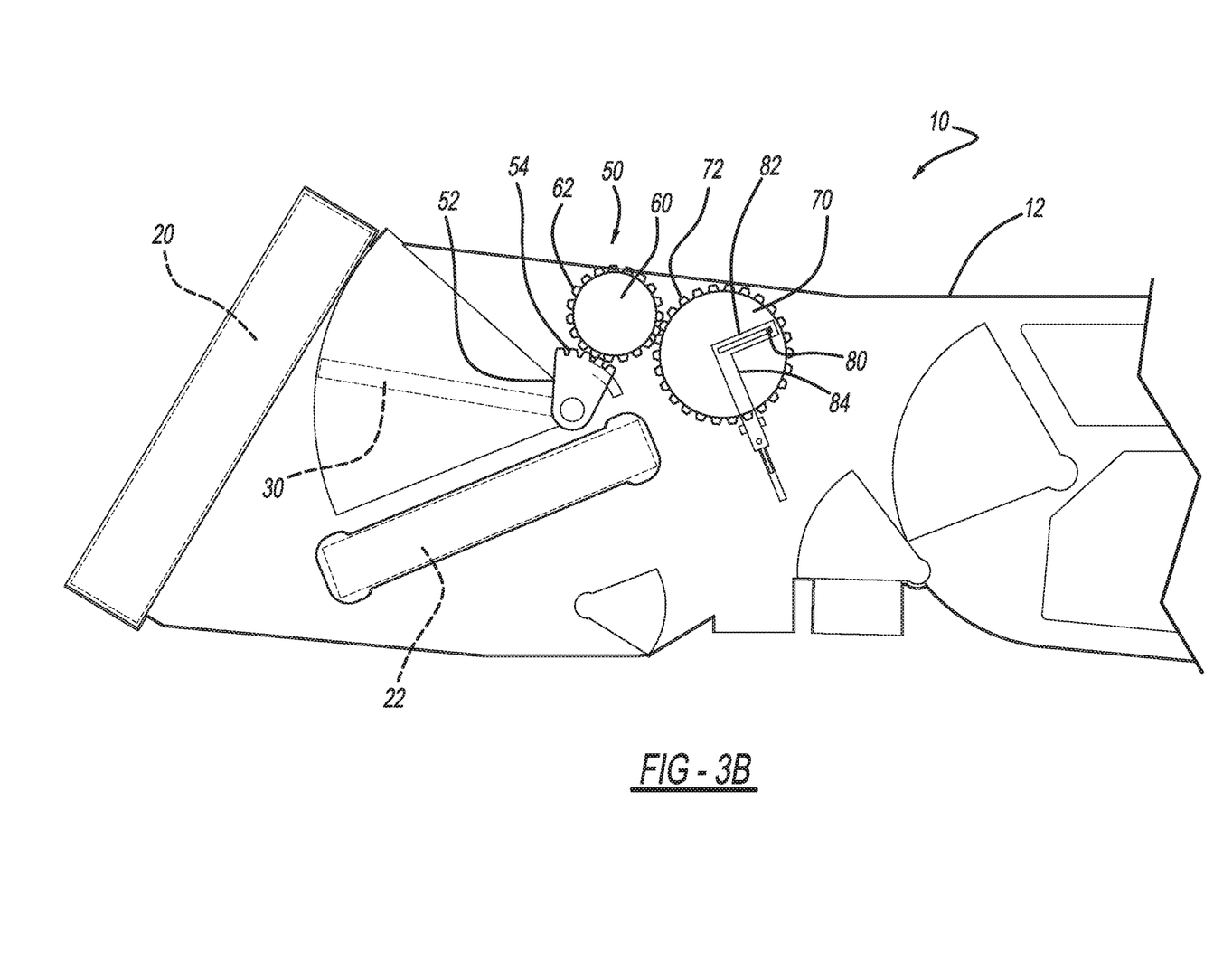
FIG. 3B is an exterior view of the HVAC unit according to the present teachings in the air-mix mode.

FIGS. 2A and 2B illustrate the HVAC unit 10 in a maximum heat mode. In the maximum heat mode, the temperature control door 30 is rotated away from the heater core 22 so as to direct all airflow A that has passed through the evaporator 20, which is deactivated in the max heat mode, through heater core 22 in order to heat the airflow A. The airflow control door 32 is arranged in a retracted position, which increases the cross-sectional area X of the airflow path across the airflow control door 32 to a maximum area, thereby facilitating the flow of warmed airflow A' across airflow control door 32 and out from within the HVAC unit 10. Increasing the cross-sectional area X of the airflow path advantageously allows the warmed airflow A' to make a smoother pass around the airflow control door 32. With particular reference to FIG. 2B, rotation of the temperature control door 30 to the second position for the maximum heat mode, such as by any suitable servo motor, rotates the first gear 52, which rotates the intermediate gear 60, and ultimately the second gear 70. The second gear 70 is rotated about 90° from the position of FIG. 1B (maximum cold mode). Rotating the pin 80 to the position of FIG. 2B moves the arm 84 linearly, which moves the airflow control door 32 coupled thereto to the retracted position of FIG. 2A.

FIGS. 3A and 3B illustrate the HVAC unit 10 in an air-mix mode. In the air-mix mode, the temperature control door 30 is arranged in an intermediate position between the first position of FIG. 1A (maximum cold mode) and the second position of FIG. 2A (maximum heat mode) to direct airflow from the evaporator 20 both through and around the heater core 22. Specifically, airflow A is cooled by the evaporator 20, which is activated. A portion of airflow A is directed around the heater core 22 by the temperature control door 30 towards and to the airflow control door 32. Additional airflow A that has passed through the activated evaporator 20 is directed to and through the heater core 22 by the temperature control door 30. Airflow A' is heated by the heater core 22 and directed to the airflow control door 32, such as by the ramped surface 36. The airflow control door 32 is arranged in an intermediate position between the extended position of FIG. 1A (maximum cold mode) and the retracted position of FIG. 2A (maximum heat mode) to provide the cross-sectional area X of the airflow path across the airflow control door 32 with an intermediate area to facilitate mixing of the cooled airflow A, which has only passed through the evaporator 20, with the heated airflow A', which has been heated by the heater core 22.

When the airflow control door 32 is arranged in the intermediate position of FIG. 3A, the cross-sectional area X of the airflow path at the airflow control door 32 is greater than that provided when the airflow control door 32 is in the extended position of FIG. 1A, and less than that provided when the airflow control door 32 is in the retracted position of FIG. 2A. Arranging the airflow control door 32 in the intermediate position of FIG. 3A forces the warm airflow A' to mix with the cool airflow A, and adjusts for temperature stratification. The ramped surface 36 advantageously creates a swirling effect on the warmed airflow A' so that airflow A and airflow A' does not flow around the airflow control door 32 smoothly. When the temperature control door 30 is moved to the intermediate position of FIGS. 3A and 3B, the first gear 52 rotates the intermediate gear 60 and the second gear 70 to position the pin 80 of the second gear 70 at an intermediate position generally between the positions illustrated in FIGS. 1A (maximum cold mode) and 2B (maximum heat mode), which shifts the arm 84 and the airflow control door 32 to the intermediate position of FIGS. 3A and 3B.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A heating, ventilation, and air conditioning (HVAC) unit comprising:
    an evaporator;
    a heater core arranged downstream of the evaporator with respect to a direction of airflow through the HVAC unit; and
    an airflow control door downstream of both the evaporator and the heater core, the airflow control door movable to increase and decrease a cross-sectional area of an airflow path downstream of a temperature control door, the airflow control door movable to facilitate mixing of airflow that has passed through the heater core with airflow that has passed around the heater core;
    wherein the airflow control door is movable to:
        an extended position to provide the airflow path downstream of the temperature control door with a first cross-sectional area, when the HVAC unit is in a maximum cold mode;
        a retracted position to provide the airflow path downstream of the temperature control door with a second cross-sectional area that is greater than the first cross-sectional area, when the HVAC unit is in a maximum heat mode; and
        an intermediate position between the extended position and the retracted position to facilitate mixing of airflow that has passed through the heater core with airflow that has passed around the heater core, when the HVAC unit is in an air-mix mode.

2. The HVAC unit of claim 1, wherein the temperature control door is movable to control how much airflow passes through the heater core, thereby controlling temperature of airflow exiting the HVAC unit.

3. The HVAC unit of claim 2, further comprising a linkage between the airflow control door and the temperature control door, the linkage configured to move the airflow control door and the temperature control door in unison.

4. The HVAC unit of claim 3, wherein the linkage includes:
    a first gear that rotates with the temperature control door; and
    a second gear connected to the airflow control door such that rotation of the second gear moves the airflow control door linearly to an extended position, a retracted position, and an intermediate position;
    wherein rotation of the first gear effectuates rotation of the second gear.

5. The HVAC unit of claim 4, wherein rotation of the first gear rotates the second gear by way of at least one intermediary gear between the first gear and the second gear.

6. The HVAC unit of claim 5, wherein the first gear, the second gear, and the at least one intermediary gear are at an exterior of a case of the HVAC unit.

7. The HVAC unit of claim 2, further comprising a linkage between the airflow control door and the temperature control door;
    wherein:
        the linkage moves the airflow control door to the extended position to provide the airflow path downstream of the temperature control door with the first cross-sectional area when the temperature control door is moved to a first position in which the temperature control door directs maximum airflow from the evaporator around the heater core;

the linkage moves the airflow control door to the retracted position to provide the airflow path downstream of the temperature control door with the second cross-sectional area that is greater than the first cross-sectional area, when the temperature control door is moved to a second position in which the temperature control door directs maximum airflow from the evaporator through the heater core; and the linkage moves the airflow control door to the intermediate position between the extended position and the retracted position to direct airflow from the evaporator both through the heater core and around the heater core when the temperature control door is moved to an intermediate position between the first position and the second position to direct airflow from the evaporator both through the heater core and around the heater core.

8. A heating, ventilation, and air conditioning (HVAC) unit comprising:

an evaporator;

a heater core arranged downstream of the evaporator with respect to a direction of airflow through the HVAC unit;

a temperature control door between the evaporator and the heater core movable to control how much airflow passes through the heater core, thereby controlling temperature of airflow exiting the HVAC unit, the temperature control door moveable to:

a first position to direct maximum airflow from the evaporator around the heater core when the HVAC unit is in a maximum cold mode;

a second position to direct maximum airflow from the evaporator through the heater core when the HVAC unit is in a maximum heat mode; and an intermediate position between the first position and the second position to direct airflow from the evaporator both through the heater core and around the heater core when the HVAC unit is in an air-mix mode; and an airflow control door downstream of each one of the evaporator, the temperature control door, and the heater core, the airflow control door movable to increase or decrease a cross-sectional area of an airflow path downstream of the temperature control door, the airflow control door movable to:

an extended position to provide the airflow path downstream of the temperature control door with a first cross-sectional area, when the HVAC unit is in the maximum cold mode;

a retracted position to provide the airflow path downstream of the temperature control door with a second cross-sectional area that is greater than the first cross-sectional area, when the HVAC unit is in the maximum heat mode; and an intermediate position between the extended position and the retracted position to provide the airflow path with an intermediate cross-sectional area that is greater than the first cross-sectional area and less than the second cross-sectional area, and to facilitate mixing of airflow that has passed through the heater core with airflow that has passed around the heater core, when the HVAC unit is in the air-mix mode.

9. The HVAC unit of claim 8, further comprising a linkage between the airflow control door and the temperature control door, the linkage configured to move the airflow control door and the temperature control door together.

10. The HVAC unit of claim 9, wherein the linkage includes:

a first gear that rotates with the temperature control door; and a second gear connected to the airflow control door such that rotation of the second gear moves the airflow control door linearly to an extended position, a retracted position, and an intermediate position;

wherein rotation of the first gear effectuates rotation of the second gear.

11. The HVAC unit of claim 10, wherein rotation of the first gear rotates the second gear by way of at least one intermediary gear between the first gear and the second gear.

12. The HVAC unit of claim 11, wherein the first gear, the second gear, and the intermediary gear are at an exterior of a case of the HVAC unit.

13. The HVAC unit of claim 8, wherein the temperature control door is a rotary door.

14. The HVAC unit of claim 8, wherein the airflow control door is a linear door mounted to slide linearly between the extended position, the retracted position, and the intermediate position.

15. A heating, ventilation, and air conditioning (HVAC) unit comprising:

an evaporator;

a heater core arranged downstream of the evaporator with respect to a direction of airflow through the HVAC unit; and an airflow control door downstream of both the evaporator and the heater core, the airflow control door movable to increase and decrease a cross-sectional area of an airflow path downstream of a temperature control door, the airflow control door movable to facilitate mixing of airflow that has passed through the heater core with airflow that has passed around the heater core;

the temperature control door movable to control how much airflow passes through the heater core, thereby controlling temperature of airflow exiting the HVAC unit;

a linkage between the airflow control door and the temperature control door;

wherein:

the linkage moves the airflow control door to an extended position to provide the airflow path downstream of the temperature control door with a first cross-sectional area when the temperature control door is moved to a first position in which the temperature control door directs maximum airflow from the evaporator around the heater core;

the linkage moves the airflow control door to a retracted position to provide the airflow path downstream of the temperature control door with a second cross-sectional area that is greater than the first cross-sectional area, when the temperature control door is moved to a second position in which the temperature control door directs maximum airflow from the evaporator through the heater core; and the linkage moves the airflow control door to an intermediate position between the extended position and the retracted position to direct airflow from the evaporator both through the heater core and around the heater core when the temperature control door is moved to an intermediate position between the first position and the second position to direct airflow from the evaporator both through the heater core and around the heater core.

* * * * *